(12) United States Patent
Frank et al.

(10) Patent No.: US 9,996,403 B2
(45) Date of Patent: Jun. 12, 2018

(54) SYSTEM AND METHOD FOR PROVIDING MESSAGE QUEUES FOR MULTINODE APPLICATIONS IN A MIDDLEWARE MACHINE ENVIRONMENT

(75) Inventors: Richard Frank, Naples, FL (US); Todd Little, Palatine, IL (US); Arun Kaimalettu, Kerala (IN); Leonard Tominna, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 549 days.

(21) Appl. No.: 13/572,491

(22) Filed: Aug. 10, 2012

(65) Prior Publication Data

US 2013/0086183 A1 Apr. 4, 2013

Related U.S. Application Data

(60) Provisional application No. 61/542,119, filed on Sep. 30, 2011.

(51) Int. Cl.
*G06F 15/16* (2006.01)
*G06F 9/54* (2006.01)

(52) U.S. Cl.
CPC ............ *G06F 9/544* (2013.01); *G06F 9/546* (2013.01); *G06F 2209/548* (2013.01)

(58) Field of Classification Search
USPC ....................................................... 709/206
See application file for complete search history.

(56) References Cited

U.S. PATENT DOCUMENTS 5,499,349 A * 3/1996 Nikhil et al. .................... 712/26
5,784,615 A * 7/1998 Lipe et al. ...................... 719/324
(Continued)

FOREIGN PATENT DOCUMENTS

CN 1909485 A 2/2007
CN 101719960 A 6/2010
(Continued)

OTHER PUBLICATIONS

JP 2010-165022—by Hiroomi—Machine Translation.*
(Continued)

*Primary Examiner* — Kevin T Bates
*Assistant Examiner* — Ronak Patel
(74) *Attorney, Agent, or Firm* — Tucker Ellis LLP

(57) ABSTRACT

A middleware machine environment can provide message queues for multinode applications. The transactional middleware machine environment includes a message control data structure on a message receiver and a heap data structure in a shared memory that is associated with the message receiver. The message sender operates to write a message directly into the heap data structure, and to maintain metadata associated with the message in the message control data structure. Furthermore, the message control data structure can be a ring structure with a head pointer and a tail pointer. Additionally, the message receiver resides on a server that is connected with a plurality of clients, with each of said clients keeping a private copy of the message control data structure. Also, the message receiver can support concurrent access to the message control data structure associated with the message receiver.

18 Claims, 6 Drawing Sheets

(56) References Cited

U.S. PATENT DOCUMENTS

| | | | |
|---|---|---|---|
| 5,951,657 A * | 9/1999 | Wood | G06F 5/10 710/54 |
| 5,961,651 A | 10/1999 | Gittins et al. | |
| 6,215,792 B1 * | 4/2001 | Abi-Nassif | H04W 56/004 370/447 |
| 6,557,056 B1 | 4/2003 | Lanteigne et al. | |
| 6,667,972 B1 * | 12/2003 | Foltan | H04L 65/4084 370/352 |
| 6,766,358 B1 | 7/2004 | Chesson et al. | |
| 6,847,991 B1 * | 1/2005 | Kurapati | G06F 9/544 709/213 |
| 6,871,265 B1 * | 3/2005 | Oren et al. | 711/128 |
| 6,950,852 B1 | 9/2005 | Kobayaghi et al. | |
| 7,330,927 B1 * | 2/2008 | Reeve | H04L 47/10 711/1 |
| 7,953,903 B1 | 5/2011 | Finkelstein et al. | |
| 8,738,860 B1 * | 5/2014 | Griffin | G06F 12/0897 711/122 |
| 9,558,048 B2 * | 1/2017 | Frank | G06F 9/546 |
| 2002/0062356 A1 | 5/2002 | Clarke et al. | |
| 2002/0129085 A1 | 9/2002 | Kubala et al. | |
| 2002/0129172 A1 | 9/2002 | Baskey et al. | |
| 2005/0131883 A1 | 6/2005 | Buxton et al. | |
| 2005/0251856 A1 | 11/2005 | Araujo et al. | |
| 2006/0056413 A1 | 3/2006 | Ikeda et al. | |
| 2006/0075119 A1 * | 4/2006 | Hussain | H04L 49/90 709/227 |
| 2006/0149840 A1 | 7/2006 | Thompson et al. | |
| 2006/0221990 A1 * | 10/2006 | Muller | G06F 13/28 370/412 |
| 2006/0288228 A1 | 12/2006 | Botz et al. | |
| 2007/0078995 A1 | 4/2007 | Benard et al. | |
| 2007/0101341 A1 | 5/2007 | Downing et al. | |
| 2007/0156808 A1 | 7/2007 | Koegel et al. | |
| 2007/0162457 A1 | 7/2007 | Barcia et al. | |
| 2007/0299973 A1 | 12/2007 | Borgendale et al. | |
| 2008/0069098 A1 | 3/2008 | Shah et al. | |
| 2008/0126564 A1 * | 5/2008 | Wilkinson | 709/242 |
| 2008/0141266 A1 * | 6/2008 | Hunt | G06F 21/562 718/106 |
| 2008/0244613 A1 | 10/2008 | Parthasarathy et al. | |
| 2009/0119676 A1 * | 5/2009 | Supalov | G06F 9/544 719/312 |
| 2010/0138534 A1 | 6/2010 | Mutnuru et al. | |
| 2010/0153546 A1 | 6/2010 | Clubb et al. | |
| 2010/0250684 A1 * | 9/2010 | Naish | 709/206 |
| 2011/0030039 A1 | 2/2011 | Bilange | |
| 2011/0107406 A1 | 5/2011 | Frost et al. | |
| 2011/0154443 A1 | 6/2011 | Thakur et al. | |
| 2011/0219208 A1 * | 9/2011 | Asaad et al. | 712/12 |
| 2011/0302569 A1 | 12/2011 | Kunze et al. | |
| 2012/0023296 A1 | 1/2012 | Yan et al. | |
| 2012/0066616 A1 | 3/2012 | Woods et al. | |
| 2012/0110572 A1 | 5/2012 | Kodi et al. | |
| 2012/0174124 A1 | 7/2012 | Ward et al. | |
| 2012/0179837 A1 * | 7/2012 | Bender et al. | 709/238 |
| 2012/0216216 A1 | 8/2012 | Lopez Taboada et al. | |
| 2012/0221774 A1 | 8/2012 | Atkisson et al. | |
| 2012/0254480 A1 | 10/2012 | Tamir et al. | |
| 2012/0254889 A1 | 10/2012 | Demkowicz et al. | |
| 2012/0331153 A1 | 12/2012 | Aho et al. | |
| 2013/0007377 A1 * | 1/2013 | Winn et al. | 711/147 |
| 2013/0007412 A1 | 1/2013 | Krishnamurthy et al. | |
| 2013/0275631 A1 | 10/2013 | Magro et al. | |

FOREIGN PATENT DOCUMENTS

| | | |
|---|---|---|
| JP | H0721038 A | 1/1995 |
| JP | H07152709 | 6/1995 |
| JP | 2005508032 | 3/2005 |
| JP | 2005284840 A | 10/2005 |
| JP | 2007304786 | 11/2007 |
| JP | 2010165022 A | 7/2010 |
| JP | 2011008678 | 1/2011 |
| JP | 2013513860 A | 4/2013 |
| WO | 2011071624 A | 6/2011 |

OTHER PUBLICATIONS

European Patent Office, International Searching Authority, International Search Report and Written Opinion dated Feb. 26, 2013 for International Application No. PCT/US2012/057634, 8 pages.

Search Report issued by Chinese Patent Office for Chinese patent application No. 201280047474.0, dated May 30, 2016 (2 pages).

Wang et al., "Design and Implementation of a Message Queuing Middleware", Computer Engineering, vol. 31, No. 21, Nov. 2005, pp. 81-83 (3 pages).

Notice of Allowance issued by United States Patent and Trademark Office for U.S. Appl. No. 13/572,501, dated Apr. 12, 2016.

Office Action issued by Japanese Patent Office on Japanese patent application No. 2014-533333, dated Sep. 27, 2016 (7 pages).

* cited by examiner

SYSTEM AND METHOD FOR PROVIDING MESSAGE QUEUES FOR MULTINODE APPLICATIONS IN A MIDDLEWARE MACHINE ENVIRONMENT

CLAIM OF PRIORITY

This application claims the benefit of priority on U.S. Provisional Patent Application No. 61/542,119, entitled "SYSTEM AND METHOD FOR PROVIDING MESSAGE QUEUES FOR MULTINODE APPLICATIONS IN A TRANSACTIONAL MIDDLEWARE MACHINE ENVIRONMENT" filed Sep. 30, 2011, which application is herein incorporated by reference.

CROSS-REFERENCED APPLICATIONS

The current application hereby incorporates by reference the material in the following patent applications:

U.S. patent application Ser. No. 13/572,501, entitled "SYSTEM AND METHOD FOR MANAGING MESSAGE QUEUES FOR MULTINODE APPLICATIONS IN A TRANSACTIONAL MIDDLEWARE MACHINE ENVIRONMENT," filed Aug. 10, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein is a system and method for providing message queues in a middleware machine environment. The system can comprise a message control data structure (or a first message control data structure) on a message receiver, and a heap data structure in a shared memory that is associated with the message receiver. A message sender operates to write a message directly into the heap data structure, and maintain metadata associated with the message in the first message control data structure. Furthermore, the system can comprise a mirrored copy of message control data structure (or a second message control data structure) on the message sender, wherein the message sender operates to also maintain metadata associated with the message in the second message control data structure.

DETAILED DESCRIPTION

Figure 1:
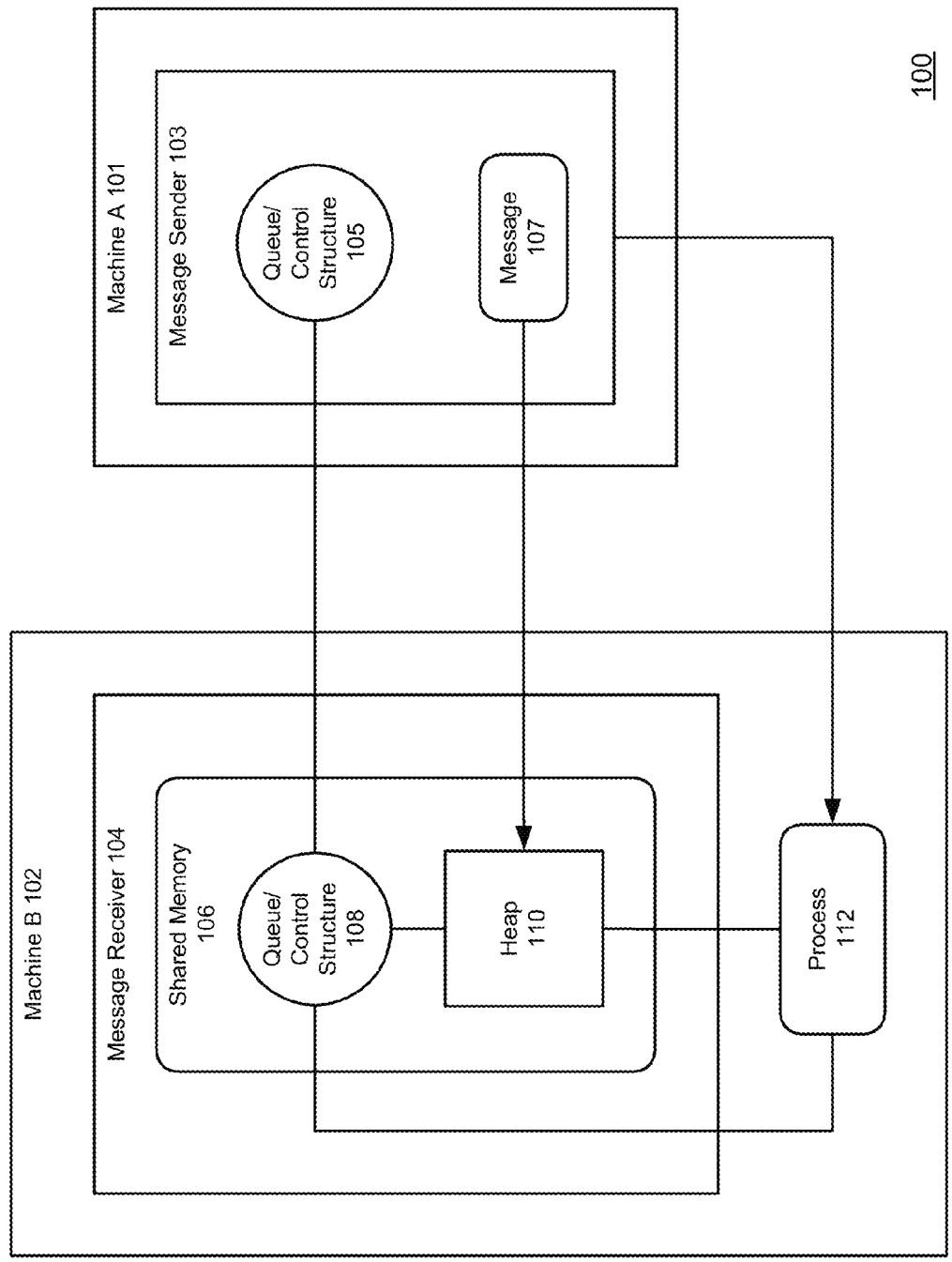
FIG. 1 shows an illustration of providing message queues for multinode applications in a middleware machine environment, in accordance with an embodiment of the invention.

Described herein is a system and method for supporting a transactional middleware system that can take advantage of fast machines with multiple processors, and a high performance network connection in a transactional middleware machine environment. The system can provide message queues for multinode applications using a data structure based on a ring buffer (a circular queue). The system includes a remote ring structure with a first ring structure on a reader and a second ring structure on a writer, wherein each of the first ring structure and the second ring structure has a head pointer and a tail pointer. When the writer operates to write a message to the remote ring, the writer can update the head pointers for both the first ring structure and the second ring structure, and the data in the remote ring structure. When the reader operates to read a message from the remote ring, the reader can update the tail pointers for both the first ring structure and the second ring structure. Additionally, the message can be stored in a heap data structure, while the metadata associated with the message can be stored in the remote ring structure.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. The system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Message Queues for Multinode Applications

In accordance with an embodiment of the invention, messaging software, such as messaging queues, can take advantage of a high performance network, such as an IB network using a remote direct memory access (RDMA) protocol. The RDMA protocol allows a message sender to bypass OS kernels and directly access to the memory without a need to wake up a process on the remote machine.

FIG. 1 shows an illustration of providing message queues for multinode applications in a middleware machine environment, in accordance with an embodiment of the invention. As shown in FIG. 1, a middleware machine environment 100 can include multiple server machines, such as Machine A 101 and Machine B 102. A message sender 103 on a local machine, e.g. Machine A 101, can send a message 107 to a message receiver 104 on a remote machine, e.g. Machine B 102. The message receiver 104 on the remote Machine B 102 can use a shared memory 106 that includes a message queue or a message control data structure 108 and a heap data structure 110.

In accordance with an embodiment of the invention, a message queue can contain only the metadata information that is associated with the message, while the heap data structure contains the physical message. Thus, messages with variable size can be easily accommodated and be stored in the shared memory. As shown in FIG. 1, the message sender 103 operates to write the message directly into the heap data structure 110, and maintain metadata associated with the message in the message control data structure 108.

Also as shown in FIG. 1, the message sender 103 includes a message control data structure 105 on the local machine, Machine A 101. The message control data structure 105 can be a copy of the message queue 108 for the message sender 103. The message sender on the local Machine A 101 can further maintain metadata associated with the message in the message control data structure 105 on the local Machine A 101.

In accordance with an embodiment of the invention, a message sender on a local Machine A 101 can directly write a message into heap data structure 110 in a shared memory 106 on the remote Machine B 102. As shown in FIG. 1, the message sender 103 can bypass the OS kernel on the remote Machine B 102, with the addressing information provided by the message receiver 104. Furthermore, the message sender 103 on the local Machine A 101 can update the status information of the message such as an input sequence number in the queue in the remote Machine B 102 via the control structure on the local Machine A 101.

Furthermore, the message sender 103 on the local Machine A 101 can send a message to a message receiver 104 regardless the size of the message. Hence, this messaging mechanism can be cost effective, efficient, and requires less overhead for large volume of data.

Additionally, the message sender 103 can wake up a process 112 on the remote Machine B 102 that is associated with the message receiver 104, according to a pre-configured procedure. For example, the message sender can wake up the process when a service request message that can be handled by the process has been delivered. In another example, the message sender can wake up a daemon process on the remote Machine B 102 when the queue is full.

In accordance with an embodiment of the invention, before a process on the message receiver, e.g. process 112, goes to sleep, the process can notice the message control structure 105 on the client side, and/or provide a procedure to the message control structure 105 on how to wake itself up. Then, the process on the receiver side can wait for the delivery of the message. For example, a process that is expecting the message can be in a sleeping status until it is wakened up by the message sender.

Also as shown in FIG. 1, after a message receiver 104 consumes a message, the message receiver can take the message out from the queue, in which case the message receiver can update the message queue 108 and the control structure 105 on the sender side by performing a RDMA write operation. Such a RDMA write operation can be performed in a manner without intervention from the client on the remote Machine B 102.

In accordance with an embodiment of the invention, in order to support two-way communications between two servers in a middleware machine environment, each server on the middleware machine can be provided with a receiver and a sender. Thus, the communication between these two servers can be performed by different message senders at the different machines, using RDMA protocol such as RDMA write operations.

Figure 2:
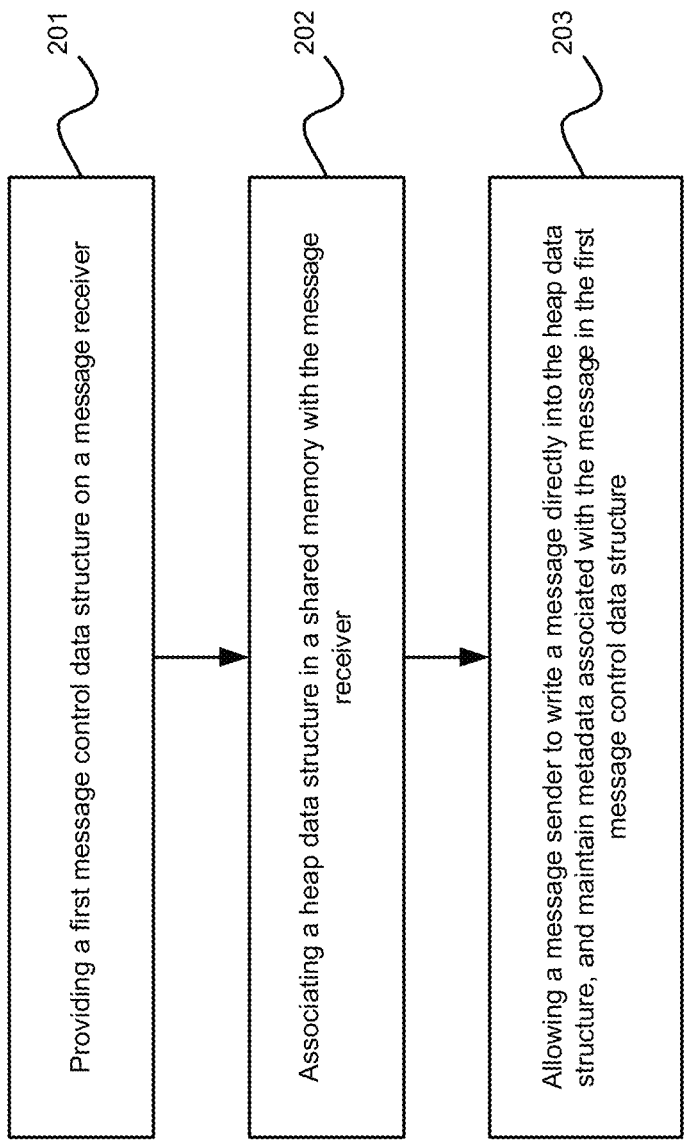
FIG. 2 illustrates an exemplary flow chart for supporting accurate load balance in a middleware machine environment, in accordance with an embodiment of the invention.

FIG. 2 illustrates an exemplary flow chart for providing message queues for multinode applications in a middleware machine environment, in accordance with an embodiment of the invention. As shown in FIG. 2, at step 201, the system can provide a first message control data structure on a message receiver. At step 202, the system can associate a heap data structure in a shared memory with the message receiver. Then, at 203, the system allows a message sender to write a message directly into the heap data structure, and maintain metadata associated with the message in the first message control data structure.

Remote Memory Rings

In accordance with an embodiment of the invention, a data structure based on a ring buffer (a circular queue) can be the backbone of this system. In a simplified case, this ring structure can work as a first-in first-out (FIFO) queue.

Figure 3:
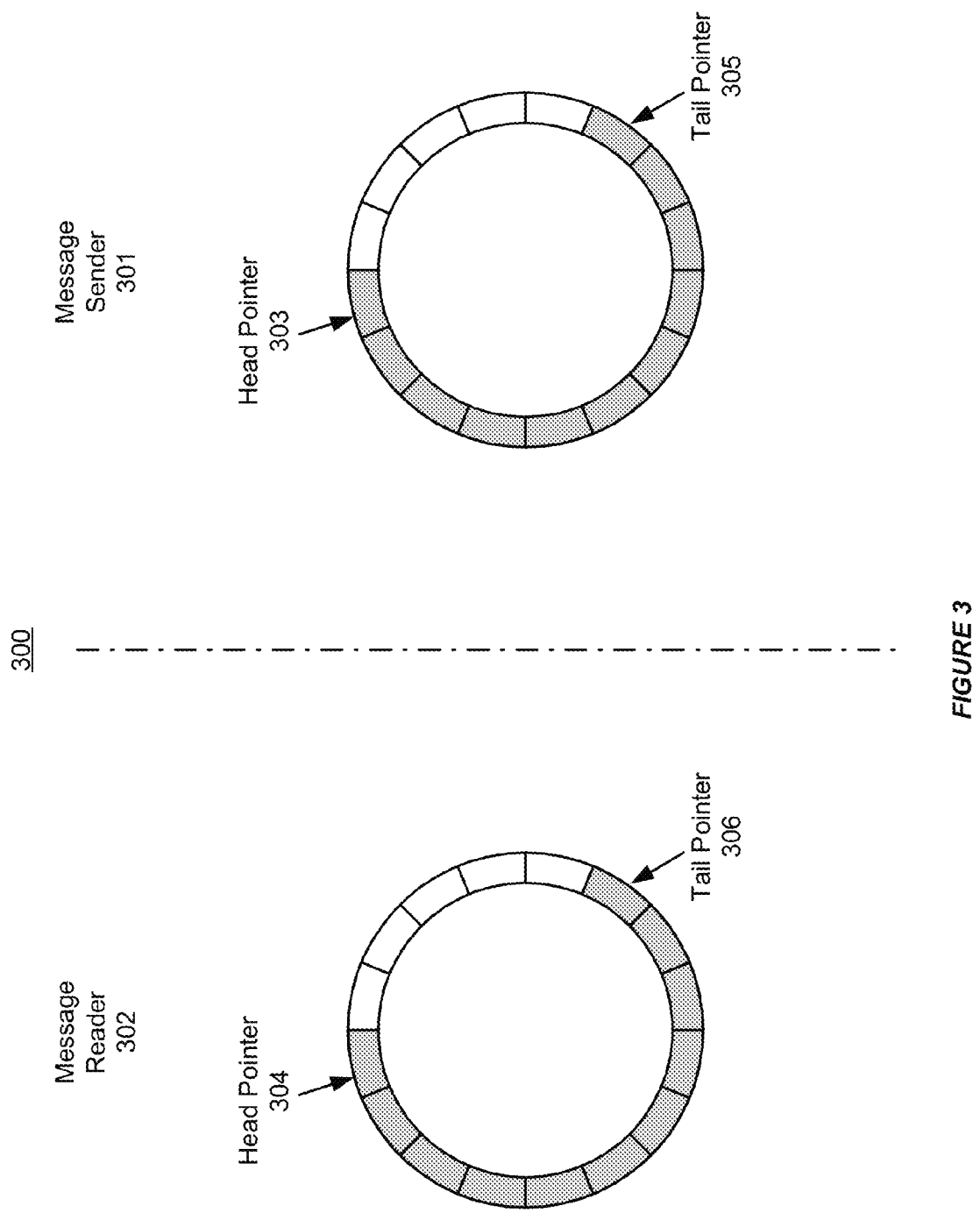
FIG. 3 shows an illustration of providing remote memory rings for multinode applications in a middleware machine environment, in accordance with an embodiment of the invention.

FIG. 3 shows an illustration of providing remote memory rings for multinode applications in a middleware machine environment, in accordance with an embodiment of the invention. As shown in FIG. 3, both the message sender 301 and the message receiver 302 can use a ring structure as a message control data structure, and each ring structure can have a head pointer and a tail pointer. When a message sender 301 operates to write a message into a message queue on a message reader 302, e.g. a heap data structure in a shared memory, the message sender 301 can update the head pointers 303 and 304 for both ring structures. On the other hand, when a message receiver 302, or a reader, operates to read a message from the heap data structure in the shared memory, the reader updates the tail pointers 305 and 306 for both ring structures.

In accordance with an embodiment of the invention, a head pointer in a ring structure points to the latest message added to the message queue and a tail pointer in a ring structure points to the oldest message in the message queue. Active messages are stored between the head pointer and the tail pointer. Message senders, or writers, can look at the free space between the head pointer and the tail pointer of the queue (the white section of the ring structure in FIG. 3) and move the head pointer forward as it writes a new message. On the other hand, message readers can look between the head pointer and the tail pointer of the queue (the shadowed section of the ring structure in FIG. 3) to get new messages and move the tail pointer forward as readers read a message. This ensures that both the head pointer and the tail pointer move only in a single direction.

In accordance with an embodiment of the invention, the following restrictions can be maintained for each ring operation: only readers update tail pointer; only writers update head pointer; the section from the tail pointer to the head pointer in a ring structure contains valid unread messages; and the section from the head pointer to the tail pointer in a ring structure is always free. Thus, the reader can read a message even when a writer writes to the ring, and synchronization is not required between the reader and the writer.

Concurrent Readers and Writers

In accordance with an embodiment of the invention, multiple message senders on different clients in a middleware machine environment can concurrently access a message queue on a server machine in the middleware machine environment.

Figure 4:
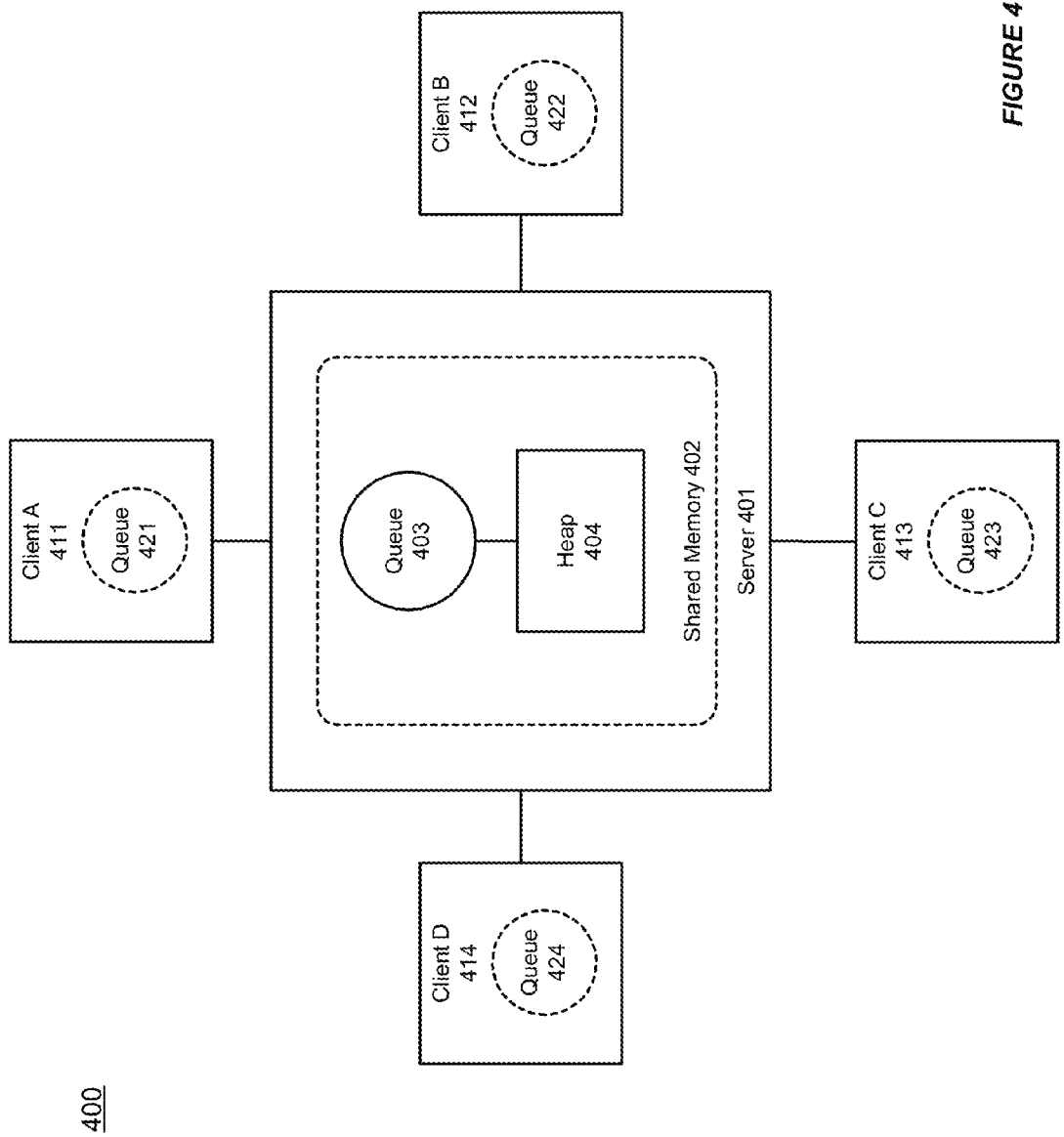
FIG. 4 shows an illustration of a message queue that can be concurrently accessed by multiple message senders in a middleware machine environment, in accordance with an embodiment of the invention.

FIG. 4 shows an illustration of a message queue that can be concurrently accessed by multiple message senders in a middleware machine environment, in accordance with an embodiment of the invention. As shown in FIG. 4, a server 401 can use a message queue 403 to concurrently handle service requests from multiple clients, e.g. Client A-D 411-414. The message queue 403 can be maintained in a shared memory 402 on the server machine. Each client can maintain a separate message queue 421-424, which can be a private copy of the message queue 403. Furthermore, the different private copies of the message queue 403 (i.e. message queues 421-424) can be synchronized with the message queue 403, e.g. periodically, in order to ensure that each message queue 421-424 is timely updated.

In accordance with an embodiment of the invention, a lock can be activated on a message queue, when the queue, or a particular entry in the queue, is currently being updated by a client. Since the queue is in a shared memory on the server machine, every other client can notice that the queue is locked and can be prevented from writing into a corresponding portion of memory that is associated with the particular entry in the queue. Furthermore, the sending of a message can be implemented by performing a RDMA write operation on the sending side. Hence, there is no need to implement a latch or a serialization mechanism on the receiving side for the lock in order to guarantee there is no confliction in writing and accessing the queue and its associated heap data structure in the shared memory.

In accordance with an embodiment of the invention, the clients can race to get an access to the queue. Once a client obtains a lock on the queue, or a particular entry in the queue, other clients can wait for the release of the lock, e.g. using semaphore mechanism provided by the OS in a single node environment or using RDMA atomics and latchless mechanisms in a multinode environment.

System V Message Queues

In accordance with an embodiment of the invention, a distributed transactional system can use a server-client model that allows clients to submit work to an available server. The clients can be provided with the results when the work is done. Work submission and its completions can be communicated using message queues. System V message queues provide an efficient way of handling work submission and completion on a single machine in a distributed transactional environment, such as the Oracle Tuxedo environment. Furthermore, System V message queues can be extended for sharing work between multiple machines.

Figure 5:
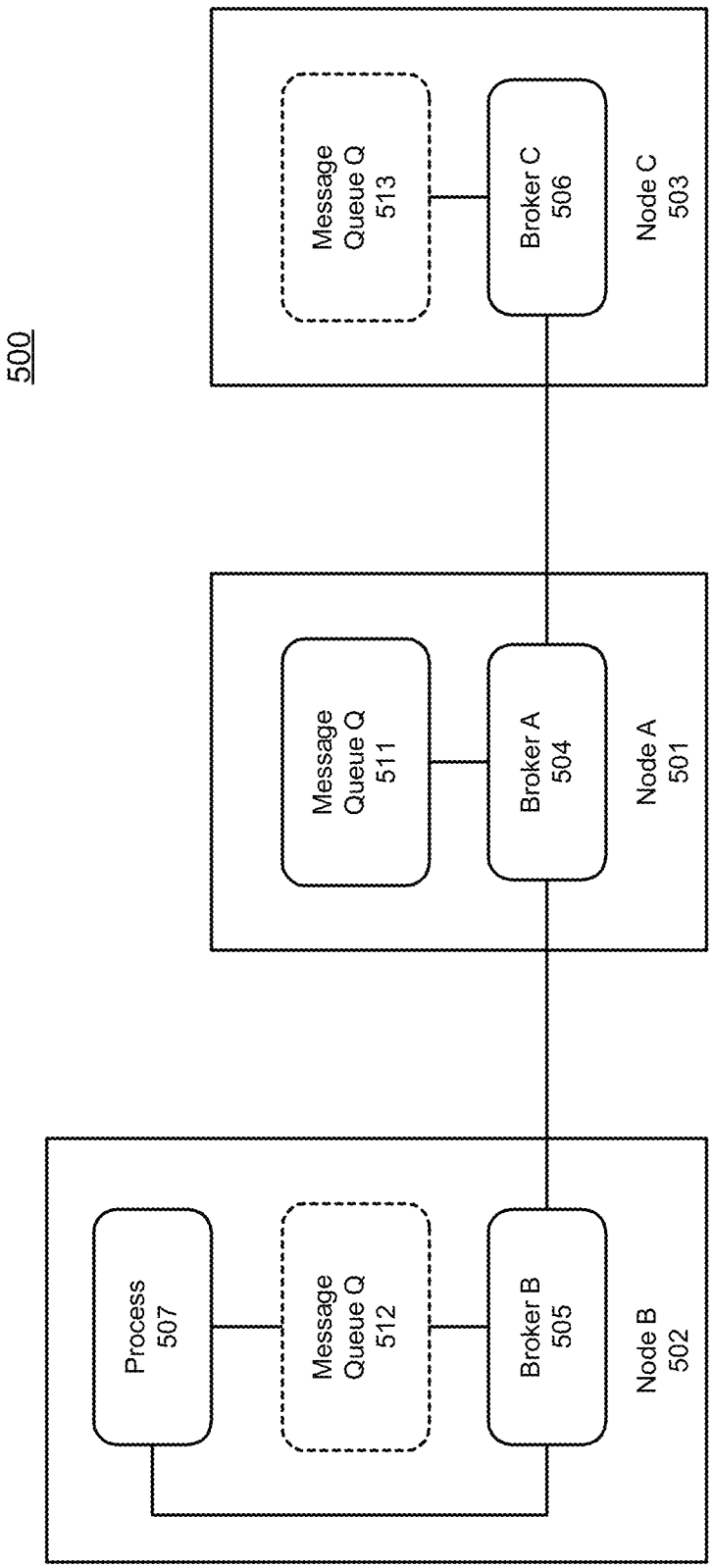
FIG. 5 shows an illustration of using System V message queues for multinode applications in a middleware machine environment, in accordance with an embodiment of the invention.

FIG. 5 shows an illustration of using System V message queues for multinode applications in a middleware machine environment, in accordance with an embodiment of the invention. As shown in FIG. 5, a shadow queue creation model can be applied over System V message queues in a middleware machine environment 500. When a message queue Q 511 is created on a node A 501, a broker on that node, broker A 504, can be informed of the existence of the message queue Q 511. Then, broker A 504 can talk to similar brokers on other nodes 502-503 and can make them create queues with same name—'Q'—on each of the node in the cluster.

In accordance with an embodiment of the invention, a process 507 on a node B 502 can write to a local message queue Q 512. Since node B is not the node where the message queue Q 511 was originally created, the broker process on node B can read the message from the message queue 512 and send the message to the broker A 504 on node A over network using TCP connections. Then, the broker A 504 can write the message into the message queue Q 511 on node A. In such a way, a process on any node can write to a queue created from any node without really knowing whether the queue is local or remote. Additionally, the broker A 504 on node A can continuously monitor all the shadow queues and propagate the messages written to any of the shadow queues into the node A where the original queue was created.

There are limitations associated with the above programming model, for example: 1) a message written from a remote node to a queue may require several (e.g. 5) memory copies to reach the destination queue. Thus, this model puts a lot of stress on the CPU bus; 2) when there are a large number of queues, the entire environment depends on the throughput of the broker, which can become a bottleneck; and 3) this model does not take advantage of an available RDMA network that can scale the transfer of messages.

RDMA Message Queues

In accordance with an embodiment of the invention, a transactional middleware system, such as a Tuxedo system, can take advantage of fast machines with multiple processors, such as an Exalogic middleware machine, and a high performance network connection.

The system can provide the transactional middleware system, e.g. Oracle Tuxedo, with an ability of using an available RDMA capable IB network with Exalogic middleware machine. RDMA can offload most of the CPU work associated with message transfer to the host channel adapter (HCA) and/or the network interface card (NIC). The system can help Tuxedo to scale its transaction processing capacity on RDMA capable system, in a manner similar to the Exalogic machines. The system can add RDMA capability to existing messaging infrastructure implementation so that users can run message queue over IB network using RDMA.

Figure 6:
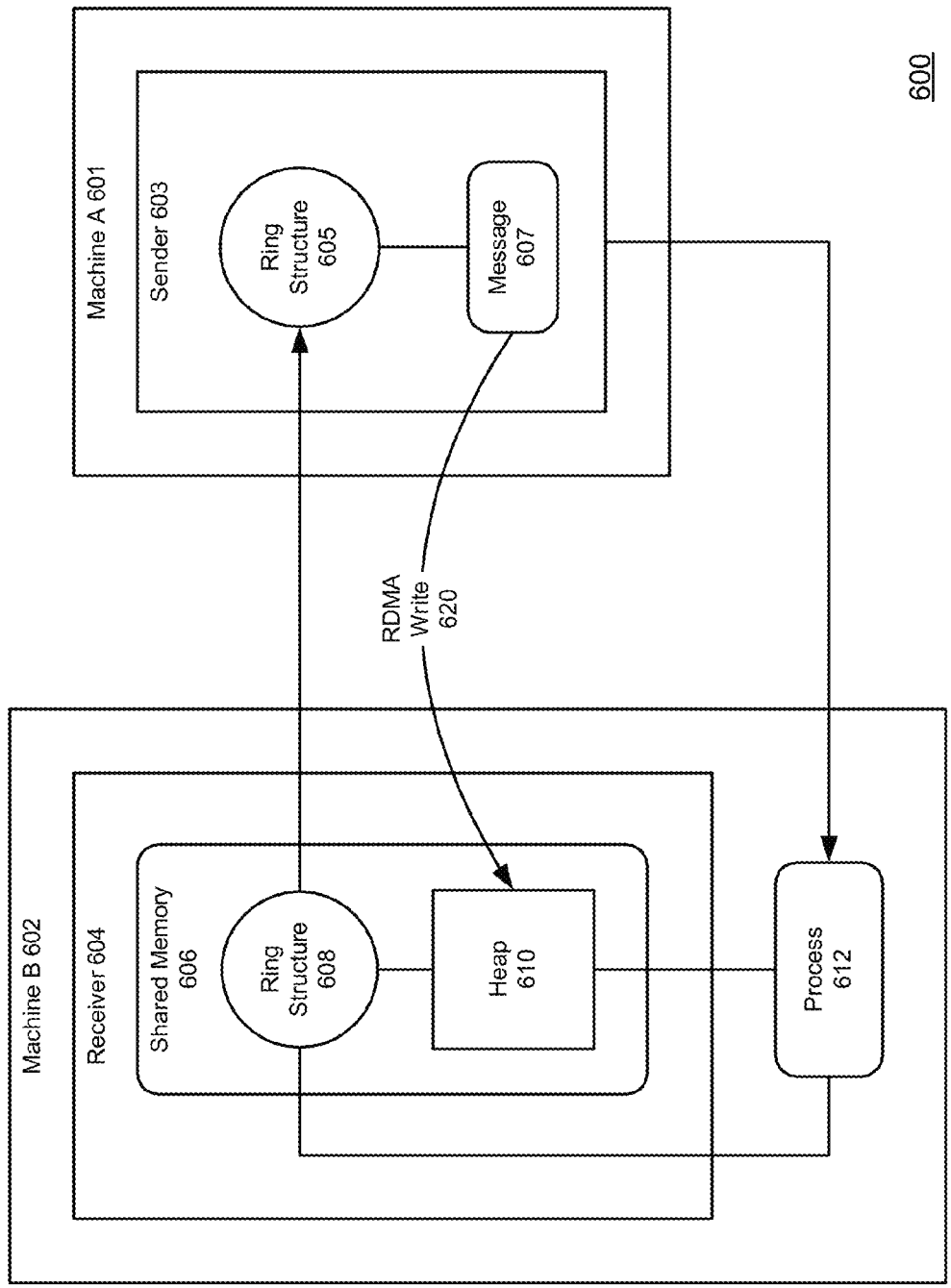
FIG. 6 shows an illustration of a remote direct memory access (RDMA) message queues for multinode applications in a middleware machine environment, in accordance with an embodiment of the invention.

FIG. 6 shows an illustration of RDMA message queues for multinode applications in a middleware machine environment, in accordance with an embodiment of the invention. As shown in FIG. 6, a two-node message queue can use a remote ring structure to represent the message queue. The remote ring structure consists on two normal ring structures: one ring structure 608 kept on the reader side and another ring structure 605 kept on the writer side. A message sender 603 on a local machine, Machine A 601, can send a message to a message receiver 604 on a remote machine, Machine B 602, e.g. using RDMA protocol 620.

In accordance with an embodiment of the invention, the message receiver can first create a queue in a shared memory in the remote machine and inform the network interface card the address of the queue in the shared memory. The message queue can be implemented using a ring buffer data structure that includes a head pointer and tail pointer. Additionally, the message receiver can implement a heap data structure in the shared memory for containing incoming messages. Then, the message receiver can notify the message sender of the creation of the message queue as well as the address information of the heap data structure in the shared memory.

Additionally, when a writer writes a new message to the message queue, the system updates ring data and the head pointer on both ring structures. The system can use RDMA to update the reader side structure if the reader is on a remote node. Likewise, readers can keep both rings updated as the readers are reading messages.

In accordance with an embodiment of the invention, messages are not stored directly in the ring structure. Only metadata about where the actual message can be retrieved is kept in the ring structure. Messages are stored in a heap data structure 610 that is kept at the reader node. The actual message can be transferred from the writer process to the allocated memory on the reader node using a RDMA write operation 620. The remote heap 610 implementation can support variable size messages. In this remote heap 610, allocation and freeing operations are done on the writer node, even though the actual heap memory is kept on the reader node. In an example, the heap memory 610 is on a reader node, while the entire heap metadata is stored on the writer node. Hence, it is possible to do heap allocation from writer's side without any network communication. Furthermore, heap management can be dissociated from the slot allocation mutex/step, to further minimize contention/simplify remote queue recovery.

The following Listing 1 contains pseudo code that illustrates the queue write and read operations when the queue is created without allowing message priorities and with the help of locks:

Listing 1

```
msgwrite(q, msg)
{
        /* get lock for writers */
    getlock(q->writers)
        /* allocate a ring slot */
        slot = allocate_ring_slot(q->ring);
        /* free old memory allocated for this slot */
        free_heap(q->heap, slot);
        /* allocate new memory */
        rmsgptr = allocate_heap(q->heap, msg->size);
        /* copy message to the reader side(RDMA) */
        remote_copy_msg(q, rmsgptr, msg->data, msg->size);
        /* update slot with message detail */
        update_slot(q->ring, slot, rmsgptr, msg->size);
        /* update slot at the remote side */
        remote_update_slot(q->ring, slot);
        /* update ring head */
        q->ring->head++;
        /* update ring head on remote side */
        remote_update(q->ring->head);
        /* free lock for writers */
        putlock(q->writers);
}
msgread(q)
{
        /* get lock for readers */
        getlock(q->readers)
        /* get the next slot from tail */
        slot = get_next_slot(q->ring);
        /* read the message from location
    pointed by ring entry at 'slot' */
        msg = read_msg_from_slot(q->ring, slot);
        /* update ring tail */
    q->ring->tail++;
        /* update ring tail on writer side */
        remote_update(q->ring->tail);
        /* free lock */
        putlock(q->writers);
        return msg;
}
```

In accordance with an embodiment of the invention, the entire queue operations can happen in the user mode by different client processes. A process can exit abnormally while it is updating a shared ring structure or heap metadata, e.g. when it is executing get_next_slot/allocate ring slot. A recovery mechanism can be used to detect the process death and make the metadata to consistent state so that other process can still operate on the same queue.

In accordance with an embodiment of the invention, a wakeup mechanism can be provided. The above pseudo code in Listing 1 outlines the steps that the system can perform in the case of a queue when it is created for a single priority. The system also allows each message to have priorities and retrieval based on priorities. Sometimes a client may ask for a message with some particular property—priority less than 'n' or equal to 'n' or not 'n' etc. If a message which can satisfy this request is not in the queue at the moment then the client process can be put into a sleep mode and waked up when a process from any node writes a message that can satisfy the request. A mechanism can be implemented based on RDMA to wake up processes that wait of specific requests.

Different client processes can read and/or write on a same queue. In such a scenario, the queue can be created on a shared memory (or a shared storage). In most of the shared memory based applications, updating a shared data may require taking a mutex. A method based on ring structure and atomic compare and swap (CAS) instructions can be implemented to avoid locks in the frequent read and write paths.

In accordance with an embodiment of the invention, the use of RDMA for message transfer can reduce the memory bus utilization. This frees the CPU from the entire message transfer, so that the CPU can do other work while messages are being transferred. Furthermore, the system becomes more scalable with the bottleneck, such as the broker for System V message queues, removed. Thus, the use of RDMA provides substantial benefit in terms of CPU usage, message transfer throughput and message transfer latency.

In accordance with an embodiment of the invention, the system can take advantage of message queues using RDMA for internode message transfer. The system can use remote ring structures to do message read and write from different machines simultaneously. The system can handle variable sized messages with remote heap allocation. A recovery model can be used to recover queues in the case that an abnormal process exits on a local node or on a remote node. Queues are created on shared memory with devised mechanism to do local or RDMA operations on shared data. The system can use a wake up mechanism based on RDMA for remote process that wait for a message, and concurrent readers and writers are allowed to operate on the same queues using latchless synchronization from user mode processes.

In accordance with an embodiment of the invention, the system can provide an interface to do queue operations between different nodes by leveraging the RDMA facility available in modern network interface cards. The programming interface provided by the interface can be similar to that of a System V API.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing message queues in a middleware machine environment, comprising:
a middleware machine environment including one or more microprocessors;
a first node and a second node operating in the middleware machine environment;
a message receiver on the first node;
a message sender on the second node;
a shared memory created on the first node and associated with the message receiver,
wherein the shared memory includes
a heap data structure for storing messages,
a first message queue including a first ring structure for storing metadata identifying addresses of messages within the heap data structure, and
wherein the first node communicates the first ring structure to the second node and the second node is configured to create, in response to the communicated first ring structure, a second message queue including a second ring structure that shadows the first message queue and is associated with the message sender;
wherein the message sender on the second node operates to allocate a portion of the heap data structure for writing a message directly into the heap data structure and maintain metadata in the first message queue identifying an address of the message within the heap data structure; and
wherein the message sender is configured to use remote direct memory access (RDMA) for the writing of the message and for locking the first message queue during the writing of the message to prevent any other node from writing to the shared memory.

2. The system according to claim 1, wherein each of the first ring structure and the second ring structure has a head pointer and a tail pointer.

3. The system according to claim 2, wherein, when the writer operates to write a message to the heap data structure in the shared memory, the writer updates the head pointers for both the first ring structure and the second ring structure, and when the reader operates to read a message to the heap data structure in the shared memory, the reader updates the tail pointers for both the first ring structure and the second ring structure.

4. The system according to claim 1, wherein the first node is on a server that is connected with a plurality of clients, each said client keeps a private copy of the first message queue that is maintained in the shared memory.

5. The system according to claim 4, wherein a lock is activated on the first message queue when an entry in the first message queue is currently being updated by a client.

6. The system according to claim 5, wherein every other client is capable of noticing that the first message queue is locked and being prevented from accessing a corresponding portion of the shared memory that is associated with the entry in the first message queue.

7. The system according to claim 6, wherein another client is allowed to access another portion of the shared memory that is associated with the entry in the message queue.

8. A method for providing message queues in a middleware machine environment, comprising:
providing a shared memory associated with a message receiver on a first node in a middleware machine environment,
wherein the shared memory includes
a heap data structure for storing messages, and
a first message queue including a first ring structure for storing metadata identifying addresses of messages within the heap data structure;
providing a message sender on a second node in a middleware machine environment;

wherein the first node is configured to communicate the first ring structure to the second node and the second node is configured to create, in response to the communicated first ring structure, a second message queue including a second ring structure that shadows the first message queue and is associated with the message sender;

allowing the message sender to allocate a portion of the heap data structure for writing a message directly into the heap data structure and maintain metadata associated with the message in the first message queue identifying an address of the message within the heap data structure; and wherein the message sender is configured to use remote direct memory access (RDMA) for the writing of the message and for locking the first message queue during the writing of the message to prevent any other node from writing to the shared memory.

9. The method according to claim 8, further comprising allowing each of the first ring structure and the second ring structure to have a head pointer and a tail pointer.

10. The method according to claim 9, further comprising: a
allowing the message sender to update the head pointers for both the first ring structure and the second ring structure, when the message sender operates to write the message to the heap data structure in the shared memory; and allowing the message receiver to update the tail pointers for both the first ring structure and the second ring structure, when the message receiver operates to read the message to the heap data structure in the shared memory.

11. The method according to claim 8, further comprising allowing the first node to be on a server that is connected with a plurality of clients, each said client keeps a private copy of the first message queue that is maintained in the shared memory.

12. The method according to claim 11, further comprising activating a lock on the first message queue when an entry in the first message queue is currently being updated by a client.

13. The method according to claim 12, further comprising allowing every other client to be capable of noticing that the first message queue is locked and being prevented from accessing a corresponding portion of the shared memory that is associated with the entry in the first message queue.

14. The method according to claim 13, further comprising allowing another client to access another portion of the shared memory that is associated with the entry in the message queue.

15. A non-transitory computer-readable storage medium storing a set of instructions providing support for consistent embedded search across enterprise applications, said instructions, when executed by one or more processors, causing the one or more processors to perform steps comprising:

providing a shared memory associated with a message receiver on a first node in a middleware machine environment, wherein the shared memory includes
a heap data structure for storing messages, and
a first message queue including a first ring structure for storing metadata identifying addresses of messages within the heap data structure;

providing a message sender on a second node in a middleware machine environment;

wherein the first node is configured to communicate the first ring structure to the second node and the second node is configured to create, in response to the communicated first ring structure, a second message queue including a second ring structure that shadows the first message queue and is associated with the message sender;

allowing the message sender to allocate a portion of the heap data structure for writing a message directly into the heap data structure and maintain metadata associated with the message in the first message queue identifying an address of the message within the heap data structure; and wherein the message sender is configured to use remote direct memory access (RDMA) for the writing of the message and for locking the first message queue during the writing of the message to prevent any other node from writing to the shared memory.

16. The system of claim 1,
wherein heap metadata identifying allocation of the heap data structure is stored on the second node; and
wherein the portion of the heap data structure for writing the message is allocated based on the heap metadata without the second node communicating with the heap data structure and the shared memory; and
wherein writing a message directly into the heap data structure includes using a direct memory access protocol to access the shared memory.

17. The method of claim 8,
wherein heap metadata identifying allocation of the heap data structure is stored on the second node; and
wherein the portion of the heap data structure for writing the message is allocated based on the heap metadata without the second node communicating with the heap data structure and the shared memory; and
wherein writing a message directly into the heap data structure includes using a direct memory access protocol to access the shared memory.

18. The non-transitory computer-readable storage medium of claim 15,
wherein heap metadata identifying allocation of the heap data structure is stored on the second node; and
wherein the portion of the heap data structure for writing the message is allocated based on the heap metadata without the second node communicating with the heap data structure and the shared memory; and
wherein writing a message directly into the heap data structure includes using a direct memory access protocol to access the shared memory.

* * * * *

UNITED STATES PATENT AND TRADEMARK OFFICE
CERTIFICATE OF CORRECTION

Page 1 of 1

PATENT NO. : 9,996,403 B2
APPLICATION NO. : 13/572491
DATED : June 12, 2018
INVENTOR(S) : Frank et al.

It is certified that error appears in the above-identified patent and that said Letters Patent is hereby corrected as shown below:

In the Specification

In Column 7, Line 20, delete "on" and insert -- of --, therefor.

In the Claims

In Column 11, Line 23, in Claim 10, after "comprising:" delete "a".

Signed and Sealed this
Second Day of March, 2021

Drew Hirshfeld
*Performing the Functions and Duties of the
Under Secretary of Commerce for Intellectual Property and
Director of the United States Patent and Trademark Office*